United States Patent
Hoch et al.

(10) Patent No.: US 12,321,398 B2
(45) Date of Patent: *Jun. 3, 2025

(54) DISTRIBUTED FILE SYSTEM FOR VIRTUALIZED COMPUTING CLUSTERS

(71) Applicant: Google LLC, Mountain View, CA (US)

(72) Inventors: Ezra N. Hoch, Tel-Aviv (IL); Shahar Frank, Ramat Hasharon (IL)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,269

(22) Filed: Oct. 24, 2022

(65) Prior Publication Data

US 2023/0085566 A1    Mar. 16, 2023

Related U.S. Application Data

(63) Continuation of application No. 14/595,236, filed on Jan. 13, 2015, now Pat. No. 11,494,447.

(51) Int. Cl.
*G06F 16/951* (2019.01)
*G06F 9/455* (2018.01)
*G06F 16/182* (2019.01)
*H04L 49/00* (2022.01)
*H04L 61/00* (2022.01)
*H04L 61/5007* (2022.01)
*H04L 67/1097* (2022.01)

(52) U.S. Cl.
CPC ........ *G06F 16/951* (2019.01); *G06F 9/45558* (2013.01); *G06F 2009/45579* (2013.01); *G06F 16/182* (2019.01); *H04L 49/70* (2013.01); *H04L 61/35* (2013.01); *H04L 61/5007* (2022.05); *H04L 67/1097* (2013.01)

(58) Field of Classification Search
CPC ....... G06F 16/951; G06F 16/182; G06F 16/18
USPC .......................................... 707/827
See application file for complete search history.

(56) References Cited

U.S. PATENT DOCUMENTS

| | | | |
|---|---|---|---|
| 7,782,869 B1 * | 8/2010 | Chitlur Srinivasa | G06F 9/5011 370/401 |
| 8,549,518 B1 * | 10/2013 | Aron | G06F 9/45558 718/1 |
| 8,601,473 B1 * | 12/2013 | Aron | G06F 16/1748 718/1 |
| 8,850,130 B1 * | 9/2014 | Aron | G06F 3/0685 711/150 |

(Continued)

OTHER PUBLICATIONS

StevenPoitras.com, "The Nutanix Bible", 54 pages, year 2014.
Hoch et al., U.S. Appl. No. 14/595,234, filed Jan. 13, 2015.

*Primary Examiner* — Thu N Nguyen
(74) *Attorney, Agent, or Firm* — Shumaker & Sieffert, P.A.

(57) ABSTRACT

A method includes, in a computing system that runs clients on multiple interconnected compute nodes, running on the compute nodes respective virtual switches and respective virtual heads. Each client is provisioned to direct file access commands using one or more access protocols to a respective virtual head running on the compute node on which the client runs, via a respective virtual switch running on the compute node on which the client runs. The file access commands issued by the clients are executed by communicating among the virtual heads using an inter-node communication protocol that is independent of the access protocols used by the clients.

20 Claims, 3 Drawing Sheets

(56) References Cited

U.S. PATENT DOCUMENTS

| | | | | |
|---|---|---|---|---|
| 8,863,124 B1* | 10/2014 | Aron | ............... | G06F 9/5061 |
| | | | | 718/1 |
| 2011/0022812 A1* | 1/2011 | van der Linden | ...... | H04L 69/08 |
| | | | | 711/E12.001 |

* cited by examiner

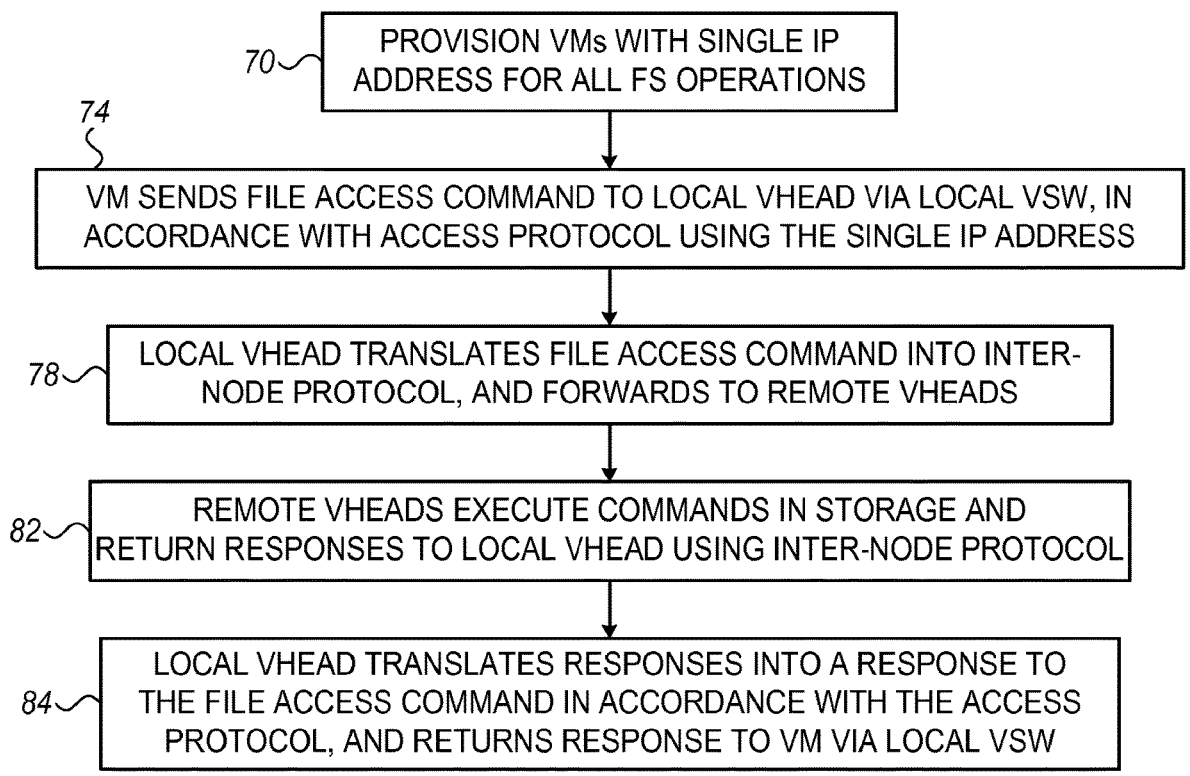
FIG. 3
FIG. 4
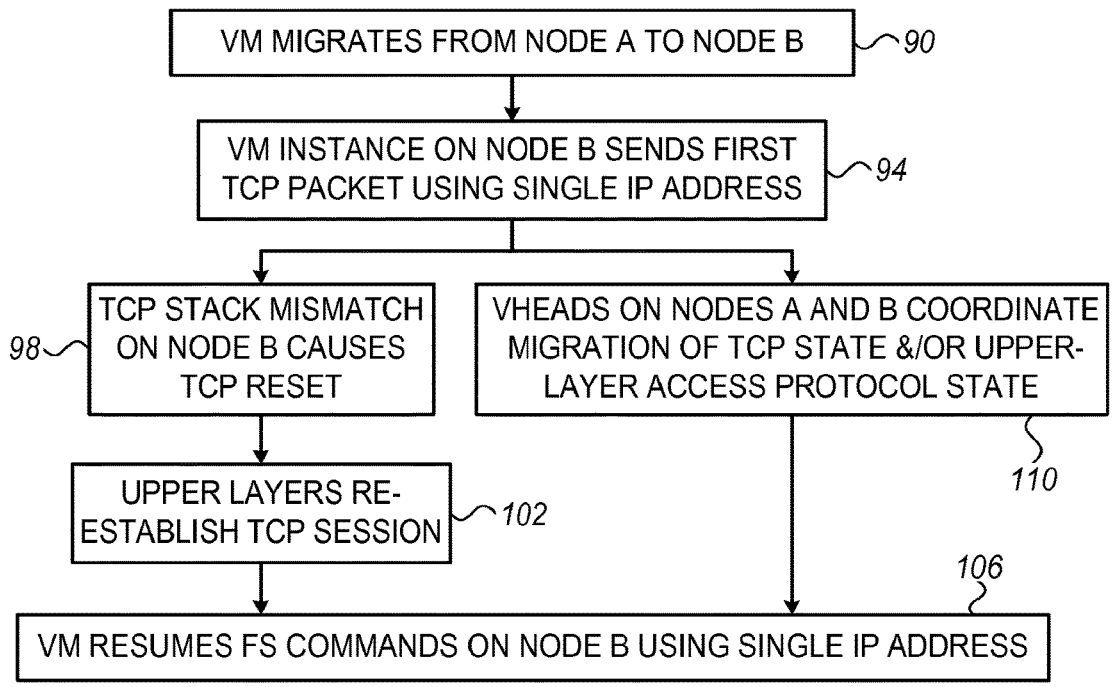

DISTRIBUTED FILE SYSTEM FOR VIRTUALIZED COMPUTING CLUSTERS

CROSS REFERENCE TO RELATED APPLICATIONS

This U.S. patent application is a continuation of, and claims priority under 35 U.S.C. § 120 from, U.S. patent application Ser. No. 14/595,236, filed on Jan. 13, 2015. The disclosure of this prior application is considered part of the disclosure of this application and is hereby incorporated by reference in its entireties.

TECHNICAL FIELD

The present disclosure relates generally to data storage, and particularly to distributed file systems.

BACKGROUND

Machine virtualization is commonly used in various computing environments, such as in data centers and cloud computing. A typical virtualized computing system includes multiple compute nodes that are interconnected by a high-speed network. The compute nodes run Virtual Machines (VMs) that consume physical resources such as Central Processing Unit (CPU), memory, persistent storage and networking resources. Some computing systems use distributed File Systems (FSs) for persistent storage of files. Examples of distributed FSs include Google File System (GFS), Hadoop distributed file system (HDFS), Ceph, General Parallel File System (GPFS) and Lustre.

U.S. Pat. Nos. 8,863,124 and 8,601,473, whose disclosures are incorporated herein by reference, describe techniques for implementing I/O and storage device management in a virtualization environment. A Service VM is employed to control and manage various types of storage devices, including directly attached storage in addition to networked and cloud storage.

SUMMARY

An embodiment of the present disclosure that is described herein provides a method including, in a computing system that runs clients on multiple interconnected compute nodes, running on the compute nodes respective virtual switches and respective virtual heads. Each client is provisioned to direct file access commands using one or more access protocols to a respective virtual head running on the compute node on which the client runs, via a respective virtual switch running on the compute node on which the client runs. The file access commands issued by the clients are executed by communicating among the virtual heads using an inter-node communication protocol that is independent of the access protocols used by the clients.

In some embodiments, the clients include Virtual Machines (VMs) and/or Operation System (OS) containers. In some embodiments, executing the file access commands includes translating a file access command received from a client into one or more commands of the inter-node protocol by a virtual head running on a same compute node as the client, and forwarding the commands of the inter-node protocol to one or more other virtual heads. In an embodiment, running the virtual heads includes, in a given virtual head, terminating the access protocols vis-à-vis the clients that run on a same compute node as the given virtual head runs on.

In some embodiments, provisioning each client includes assigning a single Internet Protocol (IP) address for the file access commands across the entire computing system, and provisioning each client to direct the file access commands to the single IP address. In an embodiment, the method includes provisioning each virtual switch to forward packets addressed to the single IP address to the respective virtual head.

In another embodiment, running the virtual heads includes serving a given client by a respective virtual head that resides in a same failure domain as the given client. In yet another embodiment, provisioning a given client includes defining in the given client a respective Virtual Network Interface Card (VNIC) dedicated for communicating with the respective virtual switch.

In still another embodiment, executing the file access commands includes communicating among the virtual heads using Remote Direct Memory Access (RDMA) commands. In a disclosed embodiment, the method includes, in response to identifying migration of a given client from a first compute node to a second compute node, coordinating execution of the file access commands issued by the given client between the virtual heads running on the first and second compute nodes.

There is additionally provided, in accordance with an embodiment of the present disclosure, a computing system including multiple interconnected compute nodes that run clients. Each compute node is configured to run a respective virtual switch and a respective virtual head, to provision one or more clients running on the compute node to direct file access commands using one or more access protocols to the virtual head running on the compute node via the virtual switch running on the compute node, and to execute the file access commands issued by the clients by communicating among the virtual heads using an inter-node communication protocol that is independent of the access protocols used by the clients.

There is further provided, in accordance with an embodiment of the present disclosure, a computer software product, the product including a tangible non-transitory computer-readable medium in which program instructions are stored, which instructions, when read by a processor of a compute node, causes the processor to run a virtual switch and a virtual head, to provision one or more clients running on the compute node to direct file access commands using one or more access protocols to the virtual head via the virtual switch, so as to execute the file access commands issued by the clients by communicating between the virtual head and one or more other virtual heads of respective other compute nodes using an inter-node communication protocol that is independent of the access protocols used by the clients.

The present disclosure will be more fully understood from the following detailed description of the embodiments thereof, taken together with the drawings in which:

DESCRIPTION OF THE DRAWINGS

FIG. 3 is a flow chart that schematically illustrates a method for data storage, in accordance with an embodiment of the present disclosure; and FIG. 4 is a flow chart that schematically illustrates a method for VM migration, in accordance with an embodiment of the present disclosure.

DETAILED DESCRIPTION

Overview

Figure 1:
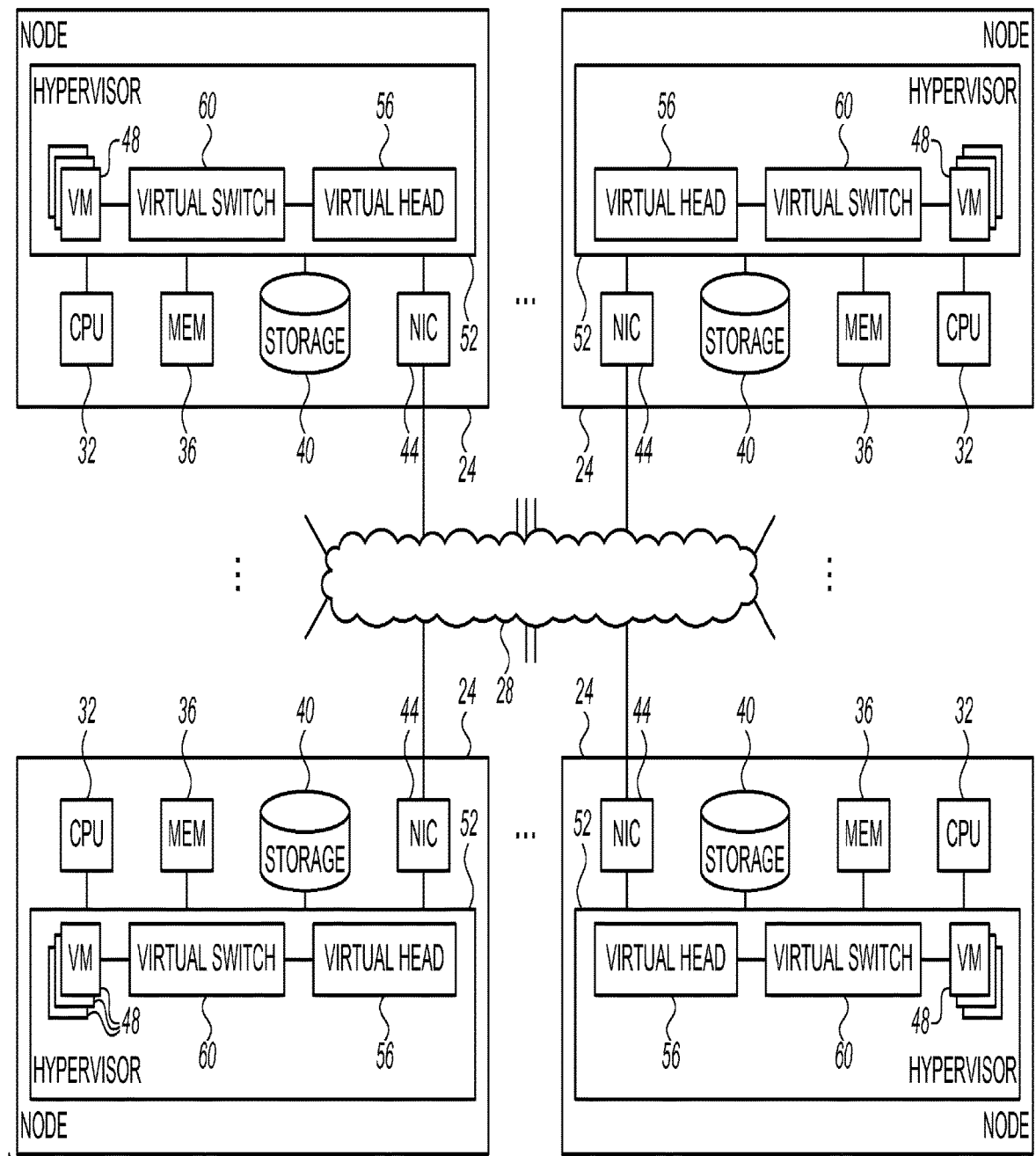
FIG. 1 is a block diagram that schematically illustrates a computing system, in accordance with an embodiment of the present disclosure.

Embodiments of the present disclosure that are described herein provide improved methods and systems for storage of files in compute node clusters. In the disclosed embodiments, a computing system, for example a data center, comprises multiple compute nodes interconnected by a network. At least some of the nodes comprise storage devices, e.g., Solid State Drives (SSDs), used for persistent storage of files. The nodes run clients, such as Virtual Machines (VMs) or Operating System (OS) partitions, which consume physical resources of the nodes including persistent storage. The methods and systems described herein provide file storage services to the clients in a distributed, transparent, low-latency and highly scalable manner.

Typically, the clients issue file access commands using access protocols such as Network File System (NFS) or Server Message Block (SMB). In some embodiments, each node runs a respective virtual head that functions as a local termination point for these access protocols, for the clients running on the node. Each node further comprises a respective virtual switch that is configured to forward file access commands between the clients and the local virtual head.

The virtual heads of the various nodes communicate with one another, so as to execute the file access commands issued by the clients. Thus, the multiple virtual heads and virtual switches can be viewed collectively as implementing a distributed File System (FS). In some embodiments, the clients across the entire system are provisioned to direct all file access commands to a single Internet Protocol (IP) address.

In the embodiments described herein, the virtual heads communicate with one another using a single inter-node communication protocol, which is independent of the access protocols used between the clients and their respective local virtual heads. As such, the communication between the clients and the virtual heads is substantially decoupled from the communication among virtual heads.

The use of a separate inter-node communication protocol among the virtual heads enables the distributed FS to provide advanced features and significant performance benefits that may not be achievable by the access protocols. Advanced features provided by the inter-node protocol may comprise, for example, multipathing, High Availability (HA), fault tolerance, dynamic load balancing, consistent low-variance performance, adaptive Quality-of-Service (QoS) and dynamic network topology awareness. The inter-node protocol may also provide high efficiency, for example by carrying out data and metadata operations in remote nodes using Remote Direct Memory Access (RDMA).

In the disclosed solution, the access protocol is used only on local, intra-node connections between the clients and the local virtual switch. The local connections are typically confined to a single failure domain, and often implemented locally in the node using memory-to-memory operations. All inter-node communication over the network is carried out using the high-performance inter-node protocol. Therefore, the inferiority of the access protocol has little or no impact on the system as a whole, and the overall system performance is determined by the performance of the inter-node protocol.

The use of an independent inter-node protocol among the virtual heads also enables most FS mechanisms to be optimized only once. Without such decoupling, it would be necessary to tailor a solution per access protocol and constantly modify drivers or other software at the clients. When using the disclosed distributed FS configuration, the vast majority of file access commands can be executed within two communication hops: An intra-node hop between the client and the local virtual head, and an inter-node hop between the local virtual head and a virtual head of another node. The resulting average latency is thus small, especially since the intra-node hop is fast and efficient.

Yet another advantage of the disclosed configuration is that each client typically resides in the same failure domain as its local virtual head. In the vast majority of cases, a hardware failure that disrupts a virtual head will also disrupt the client served by that virtual head. This relationship considerably simplifies recovery and failover mechanisms.

When using the disclosed techniques, the distributed FS operation is effectively hidden from the clients. From the perspective of the clients, file storage is performed with a single path, single head, single controller, and even a single IP address that is rerouted locally by the virtual switch in each node. The single-IP feature is also advantageous, for example, in supporting migration of clients between nodes.

System Description

FIG. 1 is a block diagram that schematically illustrates a computing system 20, in accordance with an embodiment of the present disclosure. System 20 may comprise, for example, a data center, a cloud computing system or a computing system that performs any other suitable function.

System 20 comprises multiple compute nodes 24 that communicate with one another over a computer communication network 28. Compute nodes 24 are referred to herein as nodes, for brevity, and may comprise, for example, servers, workstations or any other suitable type of compute node. Nodes 24 may communicate over network 28 in accordance with any suitable network communication protocol, such as Ethernet or Infiniband. System 20 may comprise any suitable number of compute nodes. Nodes 24 may be collocated or located in multiple geographical locations. The collection of nodes 24 is also sometimes referred to as a cluster.

At least some of nodes 24 run clients, such as Virtual Machines (VMs) 48, which in turn run client applications. A given node 24 may run any suitable number of clients, and some nodes may not run clients at all. The description that follows refers mainly to virtualized environments in which the clients comprise VMs. Alternatively, however, the disclosed techniques can be used with various other suitable types of clients, such as OS containers, in either virtualized or non-virtualized environments.

In the present example, each node runs a hypervisor 52, a virtualization layer that mediates between the VMs and physical resources such as CPU, memory, storage and networking, and allocates such physical resources to the VMs. Hypervisor 52 may comprise, for example, VMWare ESXi, Microsoft Hyper-V, Citrix Xen, RedHat KVM, Openstack, or any other suitable hypervisor.

In the example of FIG. 1, each node 24 comprises a CPU 32, a volatile memory 36 such as Random Access Memory (RAM), possibly Non-Volatile RAM (NVRAM—not shown in the figure), persistent storage 40 such as one or more Solid State Drives (SSDs) or Hard Disk Drives (HDDs), and one or more Network Interface Cards (NICs) 44. Hypervisor allocates these physical resources to VMs 48 as needed. Generally, not every node necessarily comprises all types of physical resources. For example, some nodes may not comprise storage devices 40 or NVRAM. Moreover, a given VM may utilize physical resources that do not necessarily reside locally on the node on which the VM runs.

In particular, hypervisors 52 of nodes 24 run software that jointly implements a distributed File System (FS) for providing file-level persistent storage for VMs 48 in storage devices 40. In some embodiments, the distributed FS is implemented using a respective virtual switch (VSW) 60 and a respective virtual head (VHEAD) 56, both comprising software modules that run on the respective hypervisor 52 of each node 24. The structure and functionality of this distributed FS are addressed in detail below. Some of the disclosed techniques are particularly suitable for SSDs, but the methods and systems described herein can be used with various other types of storage devices.

VMs 48 and virtual heads 56 communicate with one another using file access commands of file-level network storage protocols, also referred to herein as access protocols. Example access protocols include, for example, Network File System (NFS), Server Message Block (SMB) or object storage protocols such as Amazon S3. File access commands specify data in terms of file-level data structures such as paths, volumes, directories and filenames. It is important to distinguish the file access commands used herein from block-level commands and block-level storage solutions that specify data in terms of block addresses, e.g., physical addresses or Logical Block Addresses (LBAs).

The configurations of system 20 and nodes 24 shown in FIG. 1 are example configurations, which are chosen purely for the sake of conceptual clarity. In alternative embodiments, any other suitable system and/or node configuration can be used. The different elements of node may be implemented using suitable hardware, using software, or using a combination of hardware and software elements.

In some embodiments, CPUs 32 (which run hypervisors 52 including switches 60 and heads 56) comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Distributed FS Configuration

Figure 2:
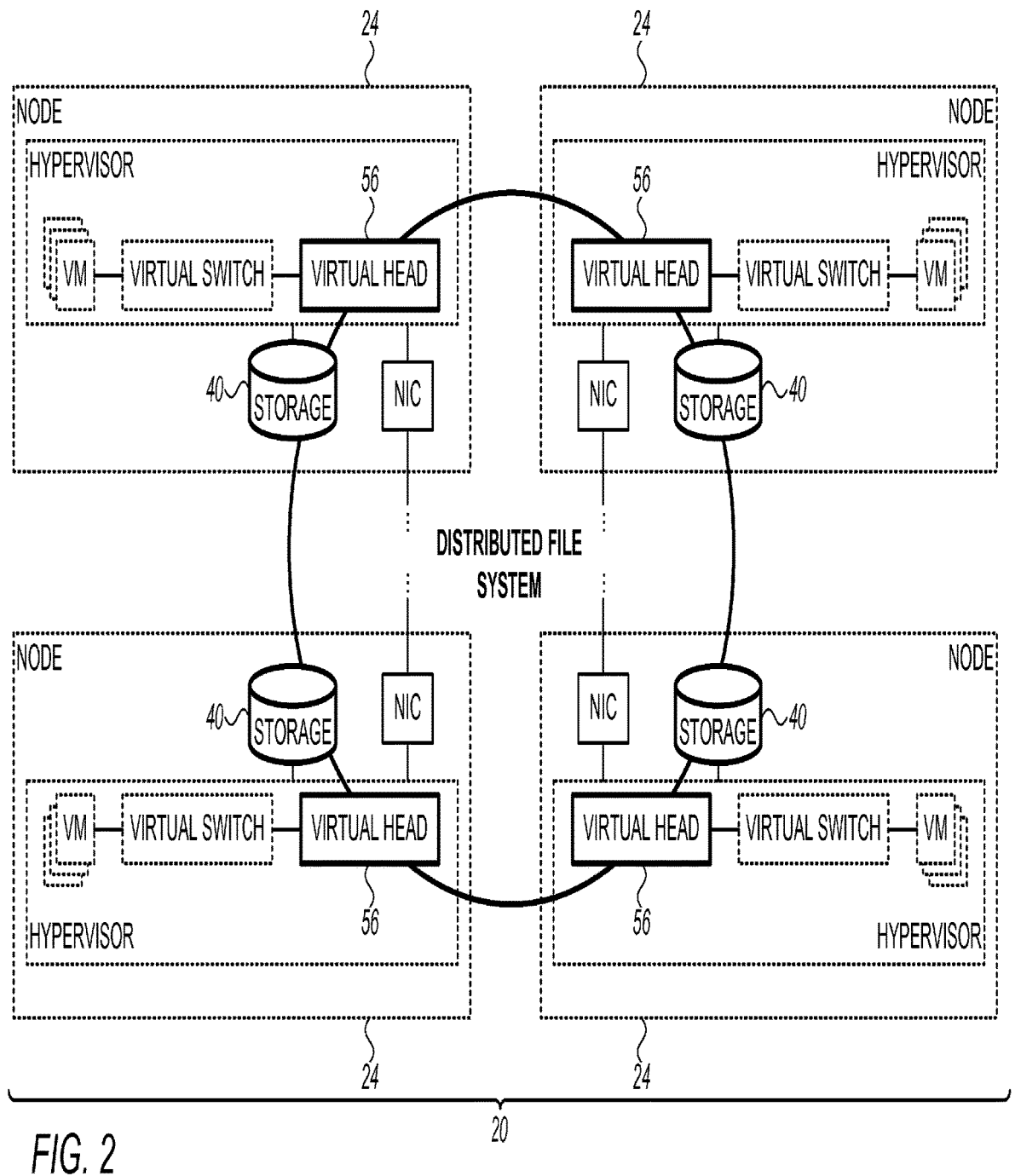
FIG. 2 is a block diagram that schematically illustrates a distributed file system in a computing system, in accordance with an embodiment of the present disclosure.

FIG. 2 is a block diagram that schematically illustrates elements of the distributed FS implemented in system 20, in accordance with an embodiment of the present disclosure. Generally speaking, each virtual head serves as a local termination point for file access commands in its respective node 24. In addition, each virtual head is responsible for accessing storage devices 40 in its respective node, if any exist. Virtual heads 56 communicate with one another over network 28, as will be explained below, so as to execute the file access commands.

Typically, a given VM 48 accesses files by sending file access commands via the local virtual switch 60 to the local virtual head 56. (In the present context, the term "local" means "running on the same node".) File access commands may comprise, for example, read, write, delete, create, and/or any other suitable type of command. The file access commands may conform to any suitable access protocol, such as, for example, NFS or SMB.

The local virtual head maps each file access command onto commands of an inter-node communication protocol that is implemented among the virtual heads. The inter-node protocol is independent of the access protocols used for communicating between the VMs and their local virtual heads. As noted above, the use of a different inter-node protocol for communication among the virtual heads enables the system to achieve a level of performance (e.g., robustness and efficiency) that is often not achievable by the access protocol or protocols.

The virtual heads typically use the same inter-node protocol across system 20, even though the VMs may use multiple different types of access protocols at the same time.

The mapping between file access commands (of the access protocol used between the VMs and the virtual head) and commands of the inter-node protocol (used between the virtual heads) need not necessarily be one-to-one. In other words, a given file access command from a VM may be translated by the local virtual head into multiple commands of the inter-node protocol, possibly destined to different nodes. Using this protocol, the virtual heads collectively execute the file access commands in the appropriate storage devices 40.

Results of the file access commands, such as retrieved data or acknowledgements, are forwarded in the opposite direction, via the local virtual head and virtual switch to the originating VM. Virtual switches 60 are typically dedicated, i.e., created and deployed for the sole purpose of supporting the distributed FS and are not used for other purposes.

Consider, for example, a scenario in which a VM on a certain node needs to read data from a file. The VM issues a read command that specifies, for example, the file name and the location of the desired data within the file. The VM sends the read command via the local virtual switch of the node to the local virtual head of the node.

The local virtual head terminates the network access protocol connection (e.g., NFS or SMB session) with the VM. In other words, the local virtual head is seen by the VM as a storage controller or storage server, and the VM is agnostic to the subsequent processing of the file access command.

The local virtual head translates the read command into one or more commands of the inter-node protocol used among the virtual heads. Generally, execution of the read command may involve multiple virtual heads in multiple nodes. For example, the file in question and/or its metadata may be distributed over multiple nodes. In such cases, the local virtual head translates the read command into multiple commands of the inter-node protocol, destined to multiple respective virtual heads.

The local virtual head sends the commands, using the inter-node protocol, to the appropriate virtual heads, which in turn execute the respective commands. The virtual heads return the results (e.g., the retrieved data) to the local virtual head of the requesting VM using the inter-node protocol. The local virtual head forwards the data to the requesting VM via the local virtual switch, now using the access protocol used by the VM (e.g., NFS or SMB).

As can be seen from the description above, a file access command can typically be executed over two round-trip hops—a local hop between the VM and the local virtual head, and an additional hop over network 28. The local hop typically has high throughput and small latency, and therefore has only a small effect on the overall execution latency.

The above scenario is an example, highly simplified scenario for demonstrating the basic concept of the distributed FS and the decoupling between the access protocol (between the VM and the local virtual head) and the inter-node protocol (among the virtual heads).

Typically, the communication between the VMs and their local virtual heads via the virtual switches complies with some standard network storage protocol, also referred to as access protocol, such as NFS or SMB. Communication among the virtual heads, however, need not comply with any standard, and may be optimized using any suitable proprietary protocol.

As a result of this decoupling, it is possible to implement and optimize mechanisms such as multipathing or failover only in the communication among virtual heads, without having to install or update any software in the VMs. Moreover, system 20 can support additional access protocols by updating only the virtual heads, again without having to install or update any software in the VMs.

When using the disclosed techniques, the VMs may issue file access commands to a single path and a single head. This configuration hides the complexity of the underlying distributed FS from the VMs, and simplifies the local communication between the VMs and the virtual heads.

Another advantage of the disclosed system configuration is that each VM typically resides in the same failure domain as its local virtual head. Since both entities run on the same hypervisor, it is highly unlikely that a hardware failure will affect a virtual head but not its local VMs. In the vast majority of cases, a hardware failure that disrupts a virtual head will also disrupt the VMs running on the same node. This relationship considerably simplifies the recovery and failover mechanisms in system 20.

Data Storage in Distributed FS Using Single IP Address

In some embodiments, VMs 48 running on the various nodes 24 of system 20 are all provisioned to direct file access commands to a single Internet Protocol (IP) address. This single IP address applies across the entire system 20, regardless of the node on which the VM runs, the virtual head with which the VM communicates, or the actual storage location of the data in question. Each virtual switch 60 is provisioned to forward packets having this IP address to the local virtual head 56.

The use of a single IP address across the entire system considerably simplifies the provisioning of VMs and makes the VMs agnostic to the underlying distributed FS. A single IP address also simplifies the support of VM migration, since when a VM migrates from one node to another, it continues to issue file access commands to the same single IP address, which in turn connects it to the new virtual head.

FIG. 3 is a flow chart that schematically illustrates a method for data storage, in accordance with an embodiment of the present disclosure. The method begins with hypervisors 52 provisioning all VMs 48 to direct file access commands to the single IP address, at a provisioning step 70. In an example embodiment, the hypervisor adds to each VM a dedicated Virtual NIC (VNIC) that communicates with virtual switch (VSW) 60 using the single IP address. The VNIC may operate, for example, in accordance with Single Root I/O Virtualization (SR-IOV). Alternatively, the VMs can be provisioned with the single IP address in any other suitable way.

At a file-access command sending step 74, a given VM sends a command that accesses a certain file. As explained above, the VM addresses the command to the single IP address and sends the command using an access protocol (e.g., NFS or SMB) to the local VHEAD 56 via the local VSW 60. VSW 60 forwards the command to the local VHEAD.

At a translation & forwarding step 78, the local VHEAD maps the file access command onto one or more commands of the inter-node protocol, and forwards the commands to the appropriate VHEADs using the inter-node protocol.

The remote VHEADs execute the commands, e.g., in their local storage device 40, and return responses to the local VHEAD using the inter-node protocol, at a command execution step 82.

At a response translation step 84, the local VHEAD translates the responses (e.g., retrieved data or acknowledgement) into a response to the file access command in accordance with the access protocol. The response is forwarded from the local VHEAD via the local VSW back to the VM using the access protocol.

FIG. 4 is a flow chart that schematically illustrates a method for VM migration, using single-IP-address file access, in accordance with an embodiment of the present disclosure. The method below refers mainly to Transmission Control Protocol (TCP), but can be adapted to other transport protocols such as User Datagram Protocol (UDP).

The method begins when a certain VM migrates from node A to node B, at a migration step 90. The migration operation itself is typically performed by some upper layer, possibly without coordination with the distributed FS.

At some point in time, the newly-created instance of the VM on node B sends the first Transmission Control Protocol (TCP) packet of the first file access command, at a first transmission step 94. This TCP packet, like all packets relating to file access commands, is addressed to the single IP address.

Since virtual switch 60 in node B is configured to deliver packets destined to the single IP address to the local virtual head 56 of node B, the TCP packet arrives at the virtual head of node B and not at the original virtual head of node A.

From this point, the distributed FS should adapt to the new location of the VM, and allow the VM to continue performing file access commands with little or no disruption. Two example mechanisms for performing this task are shown in the figure.

One possible mechanism (steps 98 and 102) makes use of the inevitable mismatch in TCP stack between node A and node B. In this example, the virtual heads of nodes A and B do not coordinate the transfer of the FS support for the VM. As such, node B will not have a matching TCP stack for the migrating VM. The mismatch will typically cause a TCP reset in node B, at a reset step 98. Following the TCP reset event, upper layers in node B will re-establish the TCP session, at a re-establishment step 102. Following the reset the VM may resume normal file access commands from its new location on node B, at a storage resumption step 106. The resumed commands are again addressed to the single IP address. This example mechanism is especially suitable for NFS implementations, and possibly some SMB variants.

In another possible mechanism, the virtual heads of nodes A and B coordinate the transfer of the TCP stack for the migrating VM, at a transfer coordination step 110. Typically, the virtual head of node A sends the current TCP state of the VM to the virtual head of node B. The VM may then resume normal file access commands from node B, at step 106. Additionally or alternatively, the virtual heads of nodes A and B may coordinate the transfer of other information relating to the migrating VM, such as transfer of the state of an upper-layer access protocol (e.g., NFS or SMB state).

The processes of FIGS. 3 and 4 above are depicted purely by way of example. In alternative embodiments, any other suitable methods can be used. For example, in some cases the solution of steps 98-102 may be preferred even when the virtual heads of nodes A and B are coordinated. The method of FIG. 4 can also be used, for example, to perform failover of a VM from a failed note to an alternative node.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

What is claimed is:

1. A computer-implemented method executed by data processing hardware that causes the data processing hardware to perform operations comprising:
   receiving, at a first virtual head executing on a first compute node, a file access command from a first client executing on the first compute node, the file access command received via a first intra-node protocol configured for communication solely between the first virtual head and clients executing on the first compute node, the first virtual head comprising a local termination point for the first intra-node protocol;
   translating, by the first virtual head, the file access command from the first intra-node protocol to an inter-node protocol, the inter-node protocol configured for communication solely between virtual heads of different compute nodes;
   transmitting, from the first virtual head, the file access command to a second virtual head executing on a second compute node, the file access command transmitted via the inter-node protocol, the second compute node different from the first compute node;
   translating, by the second virtual head, the file access command from the inter-node protocol to a second intra-node protocol configured for communication solely between the second virtual head and clients executing on the second compute node, the second virtual head comprising a local termination point for the second intra-node protocol; and
   transmitting, from the second virtual head to a second client executing on the second compute node, the file access command via the second intra-node protocol.

2. The method of claim 1, wherein the first intra-node protocol and the second intra-node protocol are different.

3. The method of claim 1, wherein the first intra-node protocol and the second intra-node protocol are the same.

4. The method of claim 1, wherein the first compute node and the second compute node belong to a distributed File System (FS).

5. The method of claim 4, wherein each compute node of the distributed FS comprises a respective virtual head.

6. The method of claim 1, wherein the first client and the second client each comprise a respective virtual machine.

7. The method of claim 1, wherein the first virtual head and the first client reside in a same failure domain.

8. The method of claim 1, wherein the first virtual head communicates with the second virtual head using Remote Direct Memory Access (RDMA) commands.

9. The method of claim 1, wherein the operations further comprise identifying a migration of the first client from the first compute node to the second compute node.

10. The method of claim 1, wherein the first client and the second client are each provisioned to direct the file access command to a single Internet Protocol (IP) address.

11. A system comprising:
    data processing hardware; and
    memory hardware in communication with the data processing hardware, the memory hardware storing instructions that, when executed on the data processing hardware, cause the data processing hardware to perform operations comprising:
      receiving, at a first virtual head executing on a first compute node, a file access command from a first client executing on the first compute node, the file access command received via a first intra-node protocol configured for communication solely between the first virtual head and clients executing on the first compute node, the first virtual head comprising a local termination point for the first intra-node protocol;
      translating, by the first virtual head, the file access command from the first intra-node protocol to an inter-node protocol, the inter-node protocol configured for communication solely between virtual heads of different compute nodes;
      transmitting, from the first virtual head, the file access command to a second virtual head executing on a second compute node, the file access command transmitted via the inter-node protocol, the second compute node different from the first compute node;
      translating, by the second virtual head, the file access command from the inter-node protocol to a second intra-node protocol configured for communication solely between the second virtual head and clients executing on the second compute node, the second virtual head comprising a local termination point for the second intra-node protocol; and
      transmitting, from the second virtual head to a second client executing on the second compute node, the file access command via the second intra-node protocol.

12. The system of claim 11, wherein the first intra-node protocol and the second intra-node protocol are different.

13. The system of claim 11, wherein the first intra-node protocol and the second intra-node protocol are the same.

14. The system of claim 11, wherein the first compute node and the second compute node belong to a distributed File System (FS).

15. The system of claim 14, wherein each compute node of the distributed FS comprises a respective virtual head.

16. The system of claim 11, wherein the first client and the second client each comprise a respective virtual machine.

17. The system of claim 11, wherein the first virtual head and the first client reside in a same failure domain.

18. The system of claim 11, wherein the first virtual head communicates with the second virtual head using Remote Direct Memory Access (RDMA) commands.

19. The system of claim 11, wherein the operations further comprise identifying a migration of the first client from the first compute node to the second compute node.

20. The system of claim 11, wherein the first client and the second client are each provisioned to direct the file access command to a single Internet Protocol (IP) address.

\* \* \* \* \*